United States Patent
Starr

(10) Patent No.: US 10,339,098 B2
(45) Date of Patent: Jul. 2, 2019

(54) CONTAINER-LEVEL ARRAY STORAGE

(71) Applicant: Matthew Thomas Starr, Lafayette, CO (US)

(72) Inventor: Matthew Thomas Starr, Lafayette, CO (US)

(73) Assignee: Spectra Logic, Corp., Boulder, CO (US)

(*) Notice: Subject to any disclaimer, the term of this patent is extended or adjusted under 35 U.S.C. 154(b) by 426 days.

(21) Appl. No.: 14/979,172

(22) Filed: Dec. 22, 2015

(65) Prior Publication Data

US 2017/0177594 A1    Jun. 22, 2017

(51) Int. Cl.
| | |
|---|---|
| G06F 17/30 | (2006.01) |
| G06F 16/11 | (2019.01) |
| G06F 3/06 | (2006.01) |
| G06F 16/188 | (2019.01) |

(52) U.S. Cl.
CPC .......... *G06F 16/119* (2019.01); *G06F 3/0619* (2013.01); *G06F 3/0643* (2013.01); *G06F 3/0647* (2013.01); *G06F 3/0689* (2013.01); *G06F 16/188* (2019.01)

(58) Field of Classification Search
CPC ......... G06F 17/30079; G06F 17/30233; G06F 3/0619; G06F 3/0647; G06F 3/0643; G06F 3/0689; G06F 16/188
USPC ....................................................... 707/823
See application file for complete search history.

(56) References Cited

U.S. PATENT DOCUMENTS

| | | | |
|---|---|---|---|
| 7,188,303 B2 | 3/2007 | Schmisseur | |
| 7,467,281 B2 | 12/2008 | Edirisooriya | |
| 7,865,798 B2 | 1/2011 | Pomerantz | |
| 7,945,726 B2 | 5/2011 | Faibish et al. | |
| 8,327,102 B1 * | 12/2012 | Palsule ................. | G06F 3/0617 711/162 |
| 8,719,488 B2 * | 5/2014 | Maheshwari ....... | G06F 12/0866 711/103 |
| 2008/0162811 A1 * | 7/2008 | Steinmetz ........... | G06F 13/4234 711/114 |
| 2009/0089502 A1 * | 4/2009 | Cheng ................. | G06F 11/1076 711/114 |
| 2009/0132760 A1 * | 5/2009 | Flynn .................... | G06F 3/0613 711/113 |
| 2012/0114302 A1 * | 5/2012 | Randall ................ | G11B 27/105 386/241 |
| 2015/0120652 A1 * | 4/2015 | Dittrich .................. | G06F 16/27 707/610 |

FOREIGN PATENT DOCUMENTS

EP    1880271 B1 *    1/2013    ........... G06F 3/0607

* cited by examiner

*Primary Examiner* — Kuen S Lu
(74) *Attorney, Agent, or Firm* — Kenneth Altshuler

(57) ABSTRACT

An apparatus and associated methodology contemplating a processor-based storage controller and a nontransient, tangible computer memory configured to store a plurality of data files. Computer instructions are stored in the computer memory defining container-level array storage logic that is configured to be executed by the controller to sequentially containerize the data files to a plurality of virtual storage containers, and to flush the virtual storage containers by migrating each storage container's contents to a respective physical storage device.

11 Claims, 8 Drawing Sheets

CONTAINER-LEVEL ARRAY STORAGE

CROSS-REFERENCE TO RELATED APPLICATIONS

None.

FIELD OF THE INVENTION

The present technology relates generally to deep storage in distributed storage systems.

DESCRIPTION OF RELATED ART

Information and management computer applications are used extensively to track and manage data relevant to an enterprise, such as marketing and sales data, manufacturing data, inventory data, and the like. Typically, the application data resides in a centralized database within a distributed storage system, and in a format such as in Oracle, Informix, or SQL and the like. Local applications integrate remote clients and network servers to use and manage the application data, and to make the application data available to remote applications such as via remote function calls (RFCs).

The centralized location of the application data can be problematic in that it places on the enterprise owner the onus of maintaining complex computer systems in order to support the applications. For example, it has traditionally been necessary for the enterprise owner to acquire the knowledge necessary to purchase and maintain the physical storage devices that store the data. The maintenance includes implementing extensive and complex requirements that protect the stored data from file loss, from storage device failure such as corrupted storage media, and even from entire installation failure. Where just file failure has occurred, it is advantageous to provide an end-user initiated recovery rather than requiring the enterprise owner's participation. When a storage failure requires complete recovery of a file system, preferably removable storage devices store the backups in a way suited for high performance streaming. Worst case, when an entire installation failure requires an offsite recovery, preferably the removable storage devices are ordered in a way making it efficient to remove them to the offsite location.

What is needed is a solution that replaces the complex and expensive archive requirements of the previously attempted solutions with a back-end archive controller having top-level control of removable physical storage devices. It is to that need that the embodiments of the present technology are directed.

SUMMARY OF THE INVENTION

Some embodiments of the claimed technology contemplate an apparatus having a processor-based storage controller and a nontransient, tangible computer memory configured to store a plurality of data files. Computer instructions are stored in the computer memory defining container-level array storage logic that is configured to be executed by the controller to sequentially containerize the data files to a plurality of virtual storage containers, and to flush the virtual storage containers by migrating each storage container's contents to a respective physical storage device.

Some embodiments of the claimed technology contemplate a method that includes: containerizing data files in a plurality of virtual storage containers; and flushing the storage containers by migrating all of the data files in each storage container to a respective physical data storage device.

Some embodiments of the claimed technology contemplate an apparatus that has a storage controller caching data files and storing parity for the cached data files, and means for striping the cached data files across a plurality of physical storage devices.

DETAILED DESCRIPTION

Initially, it is to be appreciated that this disclosure is by way of example only, not by limitation. The data management concepts herein are not limited to use or application with any specific system or method. Thus, although the instrumentalities described herein are for the convenience of explanation, shown and described with respect to exemplary embodiments, it will be appreciated that the principles herein may be applied equally in other types of storage systems and methods involving deep storage of archive data.

Figure 1:
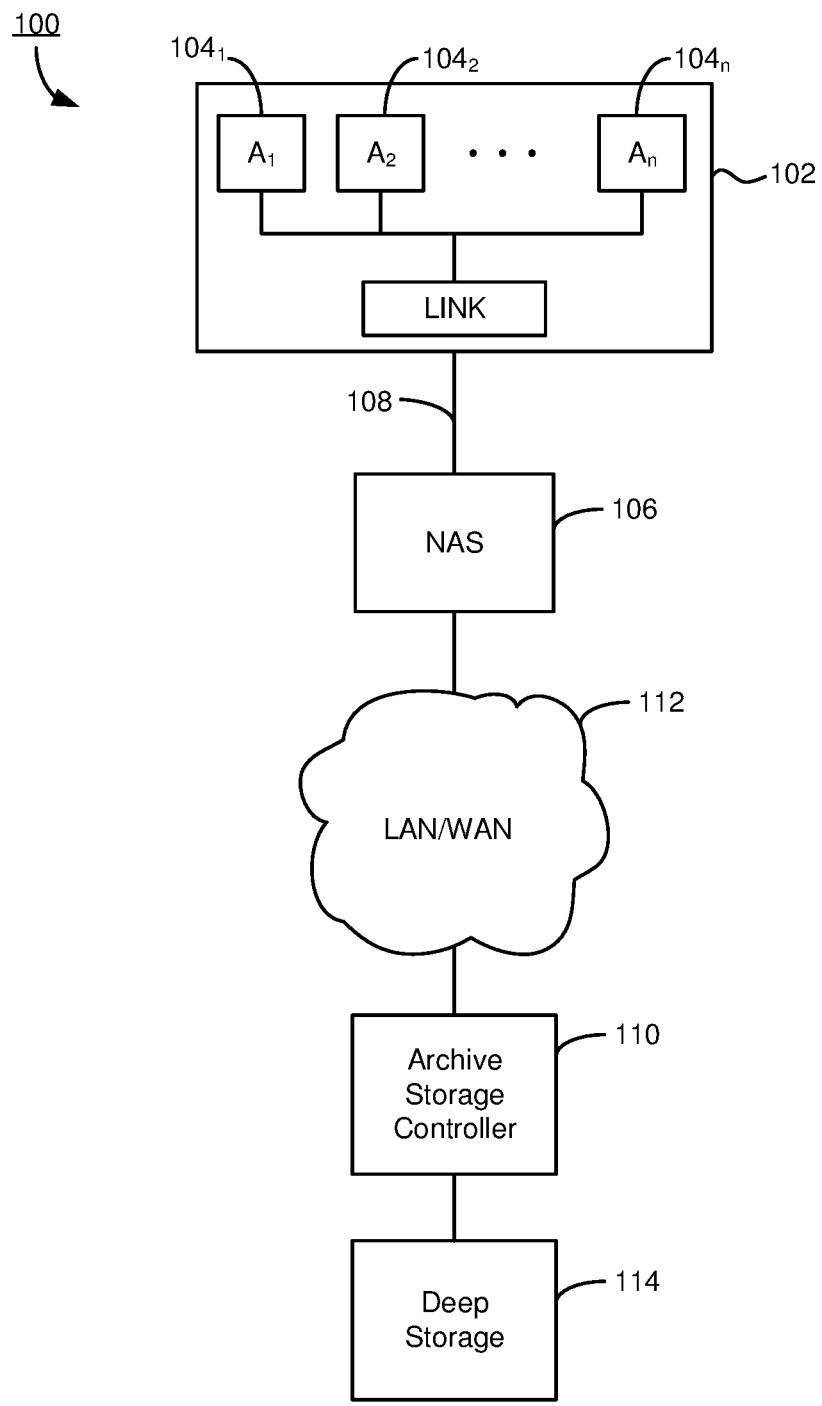
FIG. 1 is a diagrammatic depiction of a distributed data storage system that is constructed in accordance with the present technology.

To illustrate an exemplary environment in which preferred embodiments of the present technology can be advantageously practiced, FIG. 1 is a simplified depiction of an illustrative distributed storage system 100 that includes an enterprise server 102 executing a number of applications 104. The circuitries represented by the block depiction in FIG. 1 and otherwise throughout this description generally can be embodied in a single integrated circuit or can be distributed among a number of discrete circuits as desired.

A detailed description of the computer applications 104 is unnecessary for the skilled artisan to understand the scope of the claimed technology. Generally, the applications 104 can be any type of computer application such as but not limited to a point of sale application, an inventory application, a supply-chain application, a manufacturing application, and the like. The server 104 may communicate with one or more other servers (not depicted) via one or more networks (not depicted). The server 104 in these illustrative embodiments communicates with a network attached storage (NAS) device 106 via a local network 108. The NAS device 106 presents an independent storage file system to the server 102. The server 102 stores application data to and retrieves application data from the NAS device 106 in the normal course of executing the respective applications 104.

Further in these illustrative embodiments the NAS device 106 cooperates with an archive storage controller (ASC) 110 to store copies of the application data for long-term retention in a deep storage system 114. The long-term storage may be provisioned for backup copies (backups) and other data that is subject to retention policies. The NAS device 106 and the ASC 110 communicate via a network 112 that can be characterized as Ethernet based switching network. The protocol utilized by the ASC 110 makes it well suited for placement at a remote site a distance away from the NAS device 106. This protocol is compatible with the Internet and can be run over either private or public ISP networks. The NAS device 106 can execute programmed routines that periodically transfer archive data files to the ASC 110 for the long-term retention. As described in detail herein, deep storage can be managed entirely by applications in the ASC 110, independently of any control by the enterprise server 102.

The ASC 110 can provide a cloud storage compatible interface for copying the file data from the NAS 106 to the ASC 110. For example, a link application in the NAS 106 can send the file data via the network 112 through implementation of representational state transfer (REST) calls from the link module via object-oriented language. A REST architecture, such as the World Wide Web, can transfer data and command via hypertext transfer protocol (HTTP) commands such as GET, POST, DELETE, PUT, etc. Particularly, the link application can send and receive file data via connection with the ASC 110 configured as an HTTP device. The NAS 106 connection with the ASC 110 is built into the link module so that both sending file data to and receiving file data from the ASC 110 is self-contained and automatically established by the link application when necessary. Generally, the link application can map requests/responses to REST request/response streams to carry out predetermined transfers of file data via object transfers.

Figure 2:
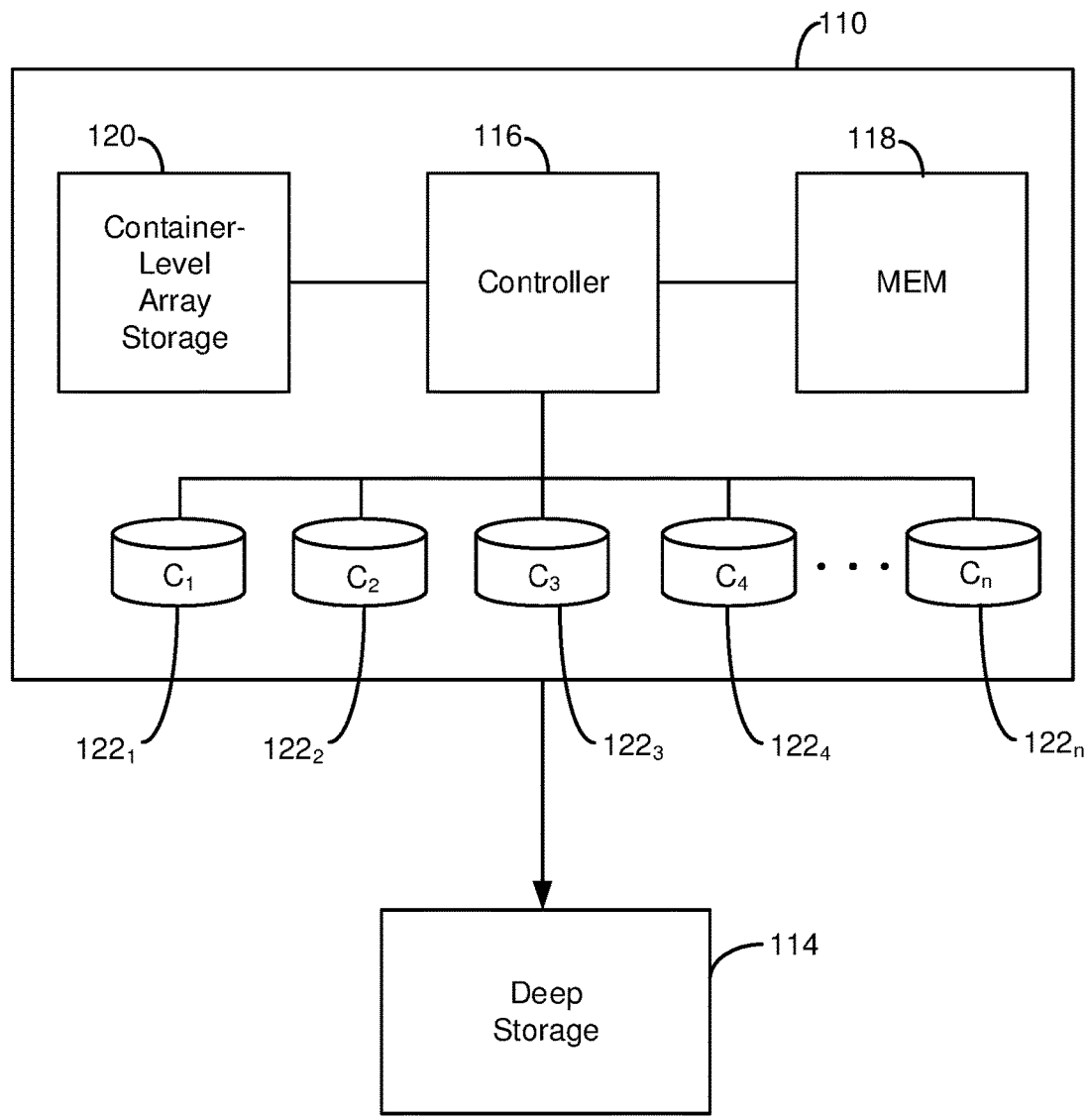
FIG. 2 is a diagrammatic depiction of the archive storage controlled in the system of FIG. 1.

FIG. 2 diagrammatically depicts in these illustrative embodiments the ASC 110 has a processor-based controller 116, preferably a programmable computer processor, providing top-level control in accordance with programming steps and processing data stored in non-volatile memory (such as flash memory or similar) and in dynamic random access memory (DRAM). A memory 118 temporarily stores (buffers) the transferred enterprise file data until such a time that the controller 116 migrates it to deep storage 114. For purposes of this description and meaning of the appended claims, the non-volatile memory, DRAM, and memory 118 are collectively referred to as the computer memory. The memory 118 can include a plurality of storage drives such as hard disk drives (HDDs) or solid-state drives (SSD), or other solid-state memory.

The ASC 110 has a container-level array storage application 120 that executes computer instructions stored in the computer memory to allocate a number of logical volumes 122 for logically arranging the file data temporarily stored in the computer memory. The logical volumes 122 are sometimes referred to herein as storage containers 122 ($C_1$, $C_2$, ... $C_n$). The number of storage containers 122 is flexible, and will be based on the format of physical storage devices selected in the deep storage 114. Each storage container 122 is only a temporary repository for the file data during the time it is migrated to the deep storage 114.

Figure 3:
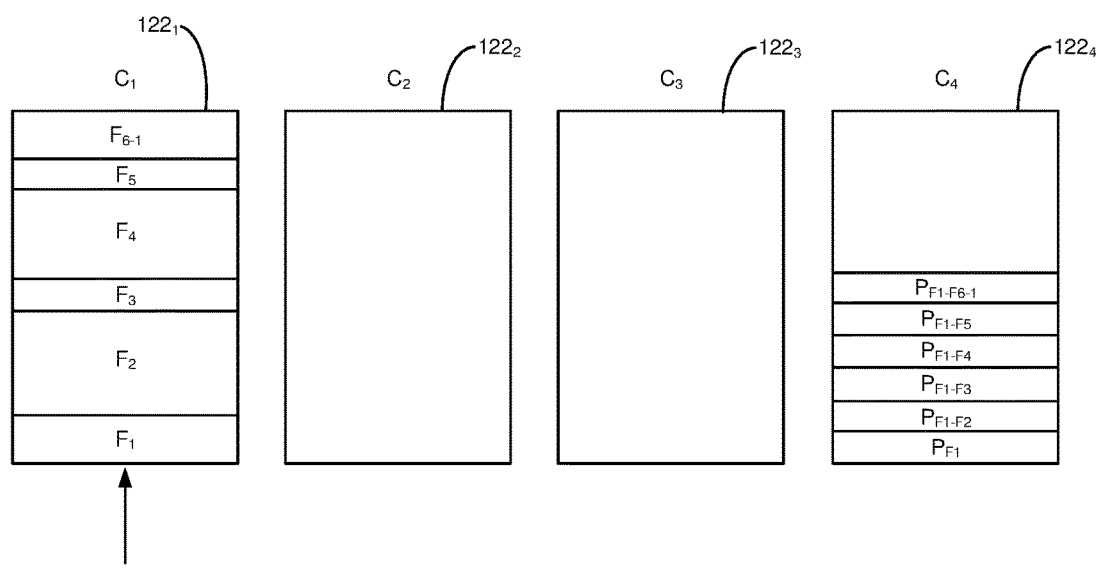
FIG. 3 is a diagrammatic depiction of the beginning of constructing a containerized file-level stripe in a first storage container, in accordance with this technology.

FIG. 3 diagrammatically depicts illustrative embodiments in which the controller 116, by executing the container-level array storage logic 120, has allocated four storage containers $C_1$, $C_2$, $C_3$, $C_4$ to temporarily store data files. Generally, the controller 116 sequentially stores the data files beginning in one of the four allocated storage containers 122, in this example beginning in storage container $C_1$. Note that the files are not necessarily the same size, for example, file F3 requires significantly less allocation than file $F_2$. In these illustrative embodiments file $F_1$ through a portion of File $F_6$ are sequentially stored to fill the storage container $C_1$. That is, after storing file $F_5$ to the storage container $C_1$ there is not enough capacity left to store the entirety of file $F_6$. The container-level array storage logic 120 is configured to divide file $F_6$ into a first portion (denoted $F_{6-1}$ stored to the storage container $C_1$ and a second portion (denoted $F_{6-2}$) stored to another storage container 122 (not depicted yet). In this example parity data is cumulatively stored in the storage container $C_4$ for the files as they are stored in the storage container $C_1$. When full, the contents of storage container $C_1$ become a stripe unit for migrating the data files to deep storage 114. For clarity, in this description and the appended claims a "stripe" means all the data files across all the storage containers when they are full. For example, the stripe currently being stored will be all of the storage container's contents when they are full. A "stripe unit" means all the data files in one storage container 122 of a stripe; for example, the contents of storage container $C_1$ (data (data files F1-$F_{6-1}$) is a stripe unit in the stripe that will be formed in this example when all the storage containers 122 are full.

Figure 4:
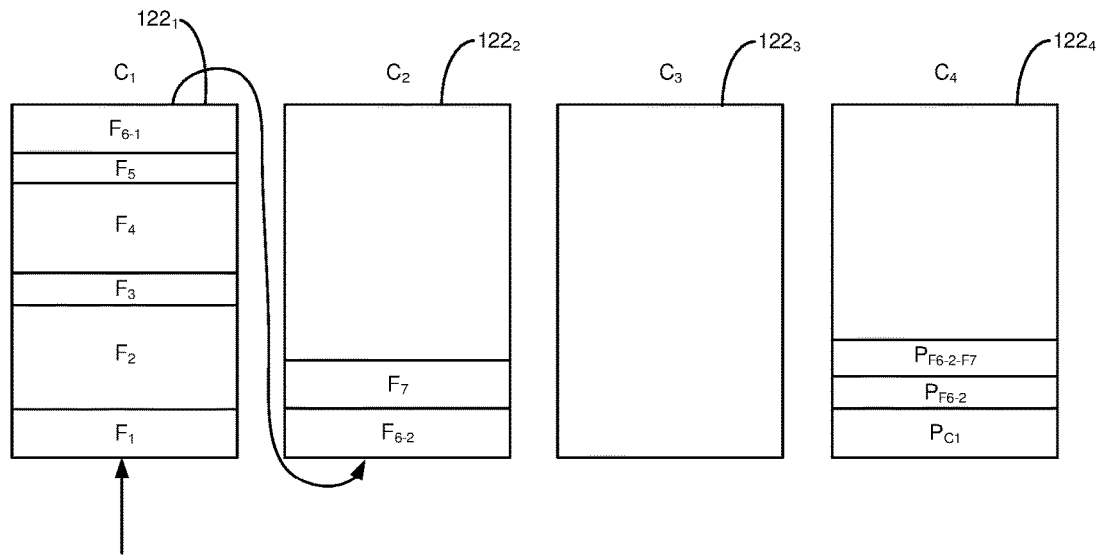
FIG. 4 is a continuation of FIG. 4 when files are being stored to a second storage container.

FIG. 4 depicts the present example continued to the point that the second portion of file $F_6$ (denoted $F_{6-2}$) is stored to the beginning of storage container $C_2$, and additional files are sequentially stored in storage container $C_2$, like previous files were stored in storage container $C_1$. For purposes of simplifying the example, the parity of the files stored in the storage container $C_1$ is depicted as $P_{c1}$ (parity of container 1) and parity continues to be stored for the files being stored to the storage container $C_2$.

Figure 5:
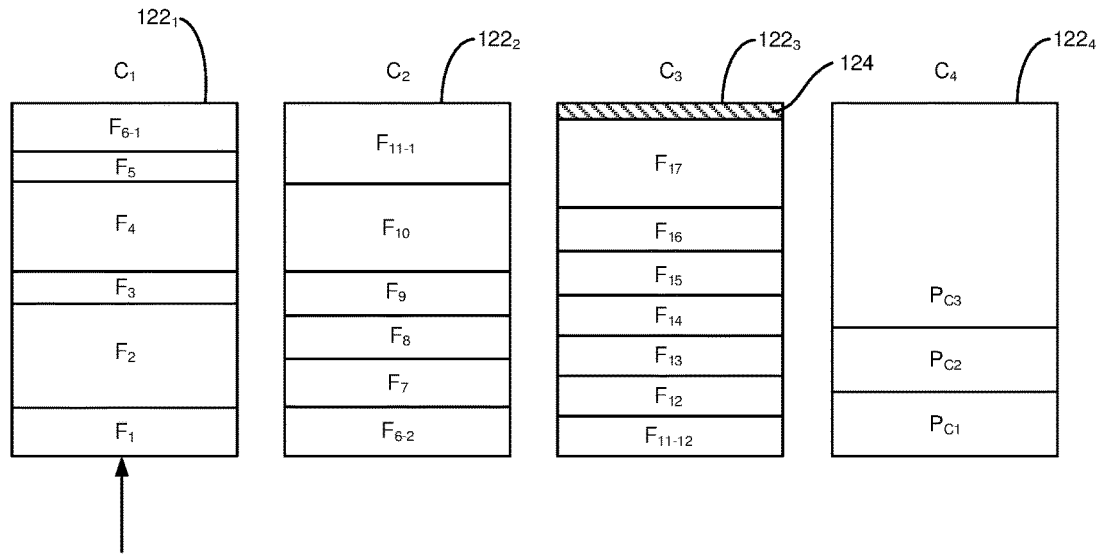
FIG. 5 is a continuation of FIG. 4 when all storage containers are full.

FIG. 5 depicts the present example continued to the point that all three storage containers containing data files ($C_1$, $C_2$, $C_3$) are full. The container-level array storage logic 120 can construct a padding file 124 to complete the filling of the last storage container $C_3$. It is virtually impossible that a last file will precisely fill the last storage container $C_3$, so the padding file 124 can be allocated for purposes of migrating completely full storage containers 122. The padding file 124 can be written when the unused space is less than a predetermined threshold, or when there is insufficient space for saving the next file, and the like. At this point, with all of the storage containers for data files full and parity stored for all the data files, it is time to flush the storage containers to the deep storage 114.

Although these illustrative embodiments depict the use of distributed parity in the file-level striping, the contemplated embodiments are not so limited. In alternative embodiments other useful redundancy (RAID) methods can be used including dual distributed parity and no parity at all. In all such cases the term "stripe" means all the files being flushed and the corresponding parity data, and "stripe unit" means all the data in one container, whether files or parity.

Figure 6:
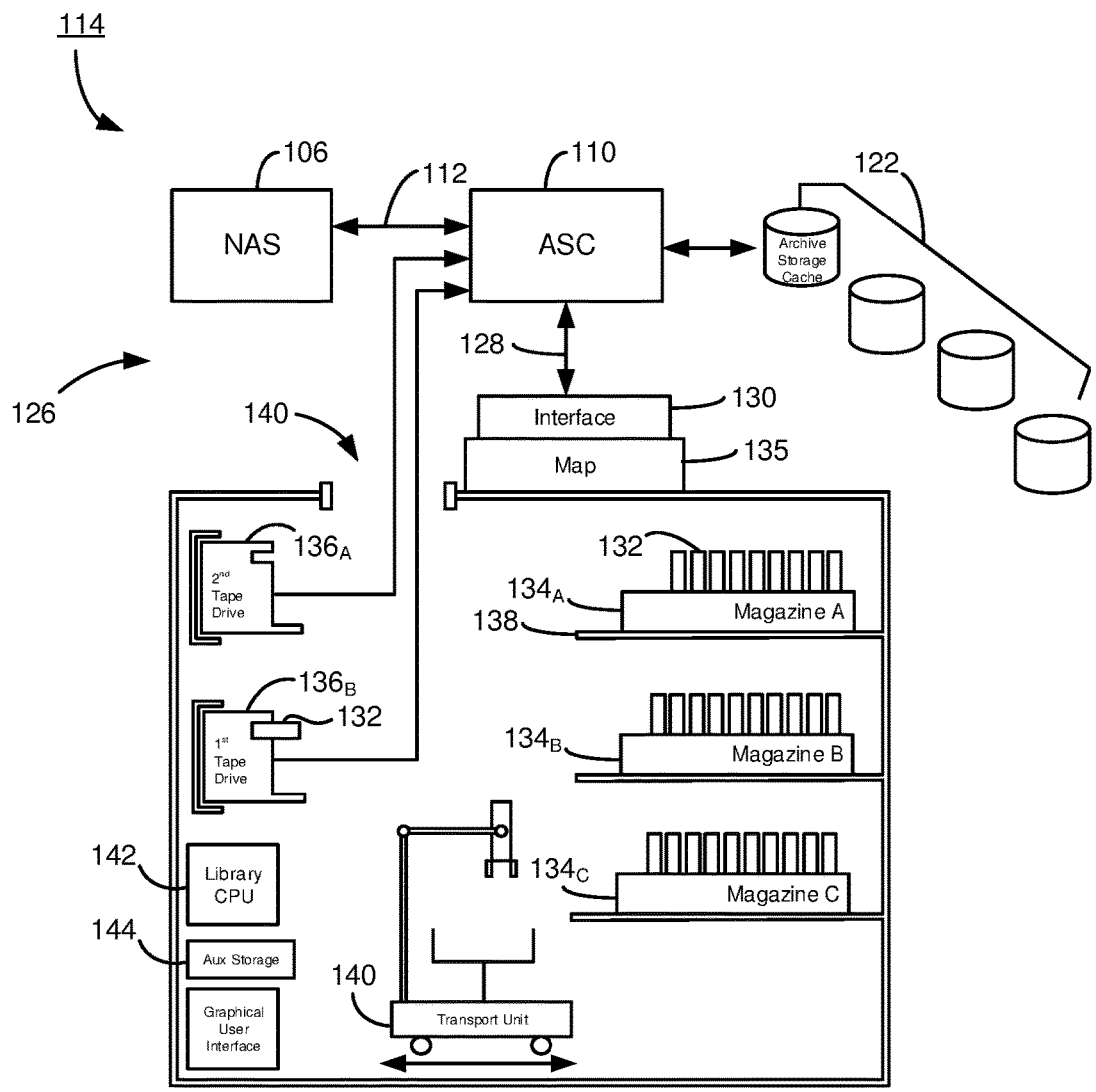
FIG. 6 is a diagrammatic depiction of a tape library used as the deep storage in the system of FIG. 1.

For purposes of continuing the description of these illustrative embodiments, the deep storage 114 (FIG. 1) can be embodied by a tape storage system. FIG. 6 depicts illustrative embodiments of a tape library 126 suited for use with this technology. The tape library 126 communicates with the ASC 110 via a communication path 128 and interface 130. Preferably, the NAS 106 transfers files to the ASC 110 without regard to the ASC 110 operations with the tape library 126. Although the ASC 110 includes computer memory for temporarily storing the files from the NAS 106, it is the ASC 110 alone without communication from the NAS 106 that controls the storage operations of the tape library 126. The tape library 126 is backend bulk storage with a much larger data storage capacity than the ASC 110.

The physical storage devices in the tape library 126 are a plurality of tape cartridges 132 grouped in magazines 134. The tape cartridges 132 can be identified by a computer control that continually tracks the position of each tape cartridge 132, both by magazine and position in the magazine. A particular tape cartridge 132 might be moved to a different position during normal operations of the tape library 126. The tape cartridges 132 can also be physically identified, such as by attaching radio frequency identification (RFID) tags or semiconductor memory devices and the like. By continuously identifying the tape cartridges 132, a selected one can be mounted into one of the tape drives 136 to transfer data to and/or retrieve data from the selected tape cartridge 132. A map module 135 logically maps the physical location of each tape cartridge 132. The logical map is used by the ASC 110 to account for the file data it stores to and retrieves from the tape library 126. In alternative embodiments the physical storage devices can be a different form, such as optical disks, optical disk cartridges, magnetic disks, optical-magnetic disks, mobile solid state memory devices, and the like.

The tape library 126 can have a shelving system 138 for queuing the magazines 134 not presently at a tape drive 136. A transport unit 140 shuttles magazines 134 between the shelving system 138 and the drives 136, and picks and places a particular tape cartridge 132 from a shuttled magazine 134 to/from a drive 136. Although FIG. 6 diagrammatically depicts three magazines 134 of nine tape cartridges 132 each being shuttled to and from two drives 136, that arrangement is merely illustrative and in no way limiting of the claimed embodiments. For example, any number of drives 136 can be provided within the tape library 126 to concurrently engage a like number of tape cartridges 132. Further, two or more tape libraries can communicate with each other by transporting magazines 134 or individual tape cartridges 132 through an access port 140.

Top-level control is provided by a central processor unit (CPU) 142 that has top-level control of all the various components and their functionalities. Data, virtual mappings, executable computer instructions, operating systems, applications, and the like are stored to a memory 144 and accessed by one or more processors in and/or under the control of the CPU 142. The CPU 142 includes macroprocessors, microprocessors, memory, and the like to logically carry out software algorithms and instructions.

As one skilled in the art recognizes, the tape library 126 depicted in FIG. 6 diagrammatically illustrates only major elements of interest for purposes of a general description. As such, certain necessary structures and components are omitted for simplicity sake, the enumeration of such not being necessary for the skilled artisan to readily ascertain the scope of the claimed subject matter. For example, it will be understood that the tape library 126 includes all of the necessary wiring, user interfaces, plugs, modular components, entry and exit port(s) to introduce (or remove) removable storage elements, fault protectors, power supplies, processors, busses, robotic transport unit tracks, indication lights, and so on, in order to carry out the function of a tape library.

Figure 7:
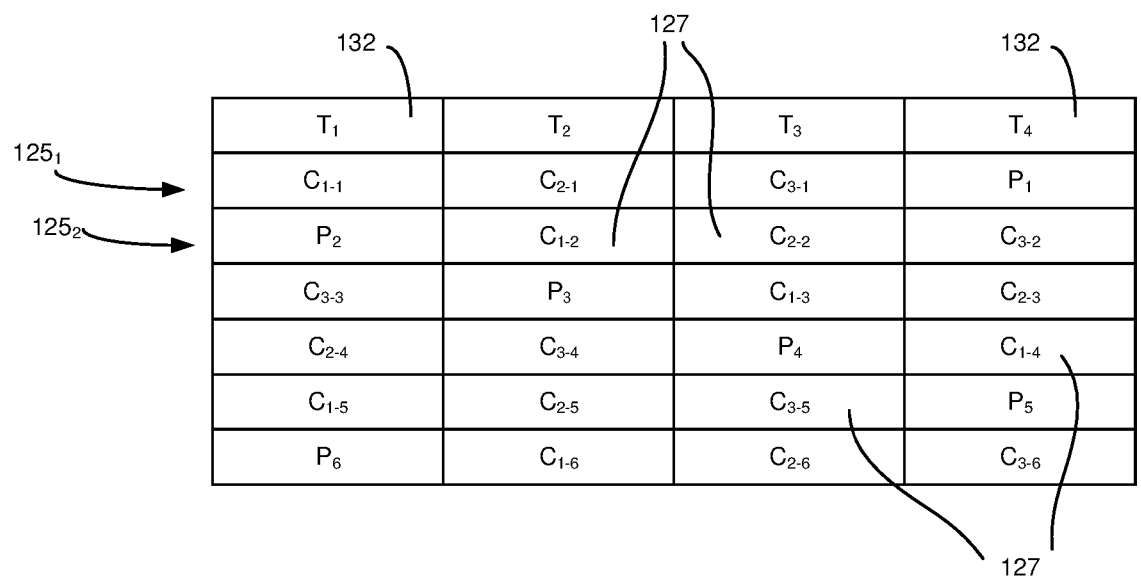
FIG. 7 is a map of the containerized file-level stripes of FIG. 5 in the physical storage devices in the tape library of FIG. 4.

FIG. 7 is a predetermined array map used by the ASC 110 executing the container-level array storage logic 120 to flush the containers 122 by migrating the container-level stripe units 127 to four tape cartridges 132 ($T_1$, $T_2$, $T_3$, $T_4$). The first stripe $125_1$ contains container-level stripe units from the first flushing event, so they are denoted by storage container number and flushing event number $C_{1-1}$, $C_{2-1}$, $C_{3-1}$, $P_1$. The three containers and parity stripe units in the second stripe $125_2$ are likewise denoted $P_2$, $C_{1-2}$, $C_{2-2}$, and $C3_{-2}$. The stripe units 127 are striped across the tape cartridges 132 with the parity data rotating among the four tape cartridges 132. That is, in the first container-level stripe $125_1$ the parity data $P_1$ is stored to the tape cartridge $132_4$, whereas in the second container-level stripe $125_2$ the parity data $P_2$ is rotated to the tape cartridge $132_1$, and so on.

Figure 8:
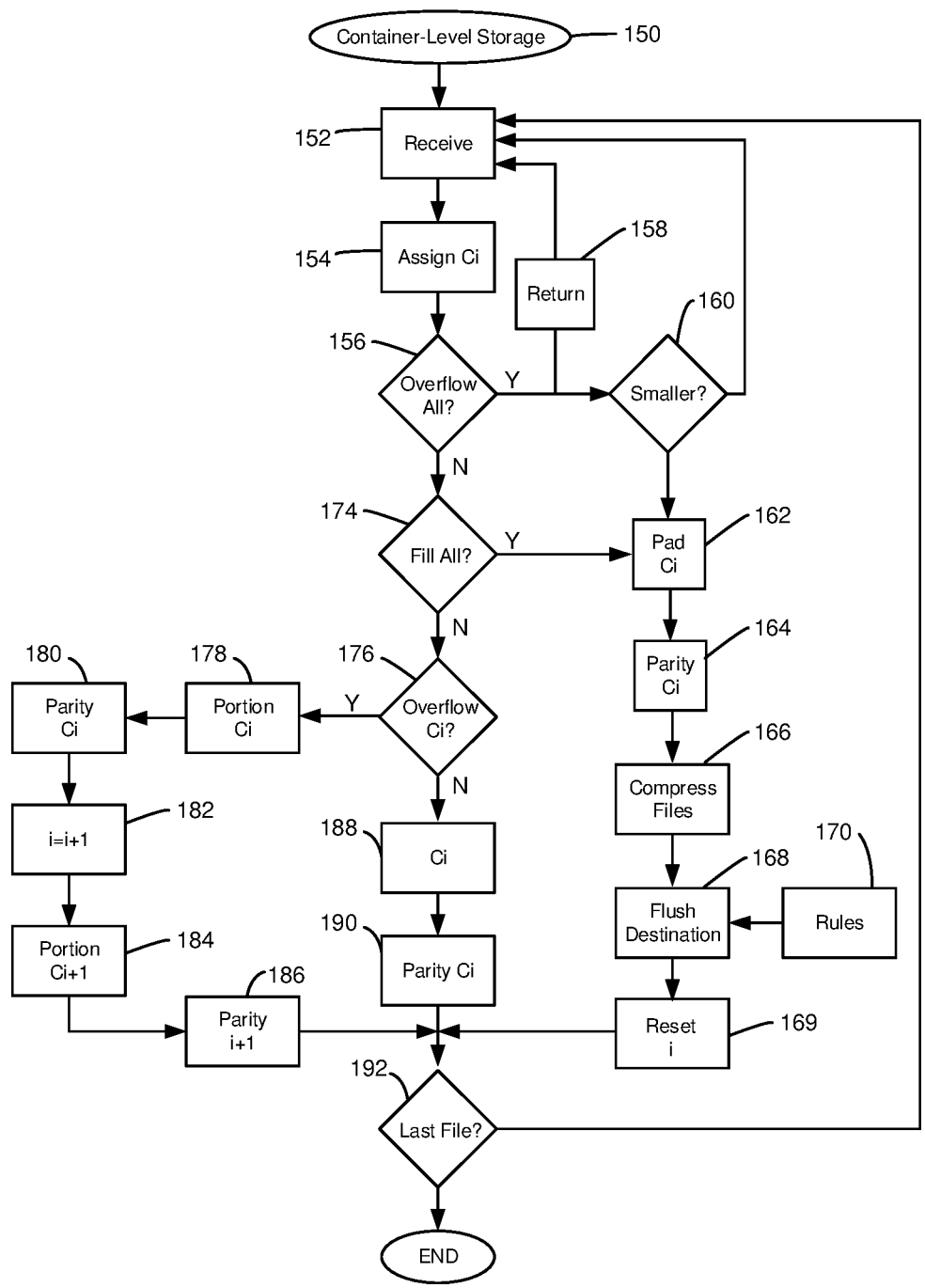
FIG. 8 is a flowchart of steps in a method for CONTAINER-LEVEL ARRAY STORAGE in accordance with this technology.

FIG. 8 is a flowchart depicting steps in a process 150 for CONTAINER-LEVEL ARRAY STORAGE in accordance with illustrative embodiments of this technology. The process is embodied in computer instructions stored in memory forming the container-level array storage logic (FIG. 2) that is executed by the controller in order to containerize files as depicted in FIG. 3 and store the files to physical storage devices as depicted in FIG. 7. The functions describing the embodiments of FIG. 8 are performed by the ASC executing the container-level array storage logic.

The process begins in block 152 with the ASC receiving a file that was transferred by the NAS. In block 154 the ASC assigns a current storage container $C_i$ for storing the most recently received file in block 152. As described, the ASC begins by selecting one of the storage containers and sequentially storing files to the selected storage container until it is full, then selecting the next storage container and likewise storing files until that storage container is full, and repeating the cycle until all of the storage containers for files are full. In block 156 a determination is made as to whether storing the most recent file would overflow all of the storage containers that are allocated for files. If the determination of block 156 is "yes," then in block 158 the most recent file is not released from the buffer for storing at this time. In block 160 a determination is made as to whether there is a smaller pending file that could be stored without overflowing the storage containers. If the determination of block 160 is "yes," then control returns to block 152 and the smaller file is received for processing by the method.

If the determination of block 160 is "no," then in block 162 a padding file is constructed to fill the last storage container. Parity that includes the last file is stored in block 164. All of the data files can be compressed in block 166, and then the files and parity are flushed to the destination physical storage devices in block 168, under the constraint of rules 170. The rules 170 in these illustrative embodiments implement striping with rotating parity, although the contemplated embodiments are not so limited. With the storage containers flushed empty, the new current storage container is reset to $C_i$ in block 169.

If, contrarily, the determination of block 156 is "no," then in block 174 a determination is made as to whether the most recent file fills all the storage containers allocated for files. That determination can be made by comparing what capacity remains after storing the most recent file with a predetermined threshold. If the remaining capacity is less than the threshold then control passes to block 162 and that portion of the process repeats as described above.

If the determination of block 174 is "no," then in block 176 a determination is made as to whether storing the most recent file will overflow the current storage container $C_i$. If the determination of block 176 is "yes," then in block 178 a first portion of the most recent file is stored to the current storage container $C_i$ and parity for the full storage container $C_i$ is stored in block 180. In block 182 the new current storage container, which is allocated for files, is incremented to the next storage container $C_{i+1}$. In block 184 the second portion of the most recent file is stored to the new current storage container $C_{i+1}$ and parity for $C_{i+1}$ is stored in block 186.

If, contrarily, the determination of block 176 is "no," then in block 188 the most recent file is stored in the current storage container $C_i$ and parity is stored in block 190. In all events, control eventually passes from one of blocks 169, 186, or 190 to block 192 for determining whether the last file has been processed. If the determination of block 192 is "no," then control returns to block 152 for processing more files in accordance with this technology.

Figure 9:
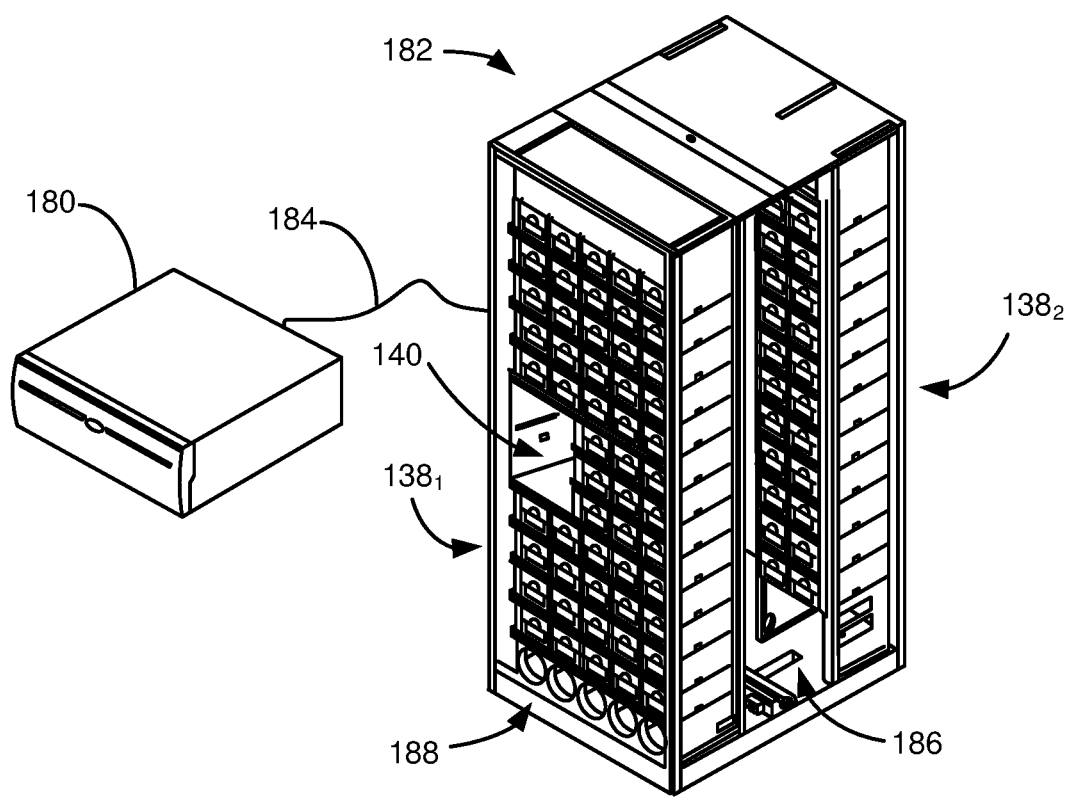
FIG. 9 is an isometric depiction of illustrated embodiments of the tape library of FIG. 4.

Embodiments of the present invention can be commercially practiced in a Black Pearl archive storage system that possesses a Spectra Logic T-Finity tape cartridge library on the backend manufactured by Spectra Logic of Boulder, Colo. FIG. 9 shows a commercial embodiment of one Black Pearl archive storage system 180 communicatively linked with the T-Finity unit 182 via a cable 184. The T-Finity unit 182 is depicted without an enclosure. The T-Finity unit 182 is depicted as a single cabinet, but in alternative embodiments multiple cabinets can be combined as necessary to make an expanded tape library or to expand an existing tape library. The Black Pearl archive storage system 180 possesses the ASC (not depicted) and computer memory (not shown) and software that facilitates receiving files from a server (not shown), caching the files in a container-level array, and migrating the container-level array to tape cartridges in the T-Finity library 182. The Black Pearl archive storage system 180 is capable of handling all tape related storage commands without the server's involvement. The T-Finity unit 182 comprises a first and second shelf system $138_1$, $138_2$ that are adapted to support a plurality of tape cartridge magazines 134 in these illustrative embodiments. The second shelf system $138_2$ has at least one tape drive (not depicted) adapted to read and write data to and from a tape cartridge. Functionally interposed between the first and second shelf system $138_1$, $138_2$ is a magazine transport space 186. The magazine transport space 186 provides adequate space for a tape cartridge magazine (not depicted) to be moved, via a magazine transport (not depicted), from a position in the shelf system $138_1$, $138_2$ to a tape drive (not depicted). Tape cartridge magazines 134 can be transferred into and out from the T-Finity library via the entry/exit port 140. The T-Finity tape library 182 includes a means for cooling as shown by the fans 188 located at the base.

It is to be understood that even though numerous characteristics and advantages of various embodiments of the present technology have been set forth in the foregoing description, together with the details of the structure and function of various embodiments of the invention, this disclosure is illustrative only, and changes may be made in detail, especially in matters of structure and arrangement of parts within the principles of the present technology to the full extent indicated by the broad general meaning of the terms in which the appended claims are expressed. For example, the disclosed technology can be employed across multiple library partitions, while still maintaining substantially the same functionality and without departing from the scope of the claimed technology. Further, though communication is described herein as between an ASC and a tape library, communication can be received directly by a tape drive, via the interface device 154, for example, without departing from the scope of the claimed technology. Further, although the preferred embodiments described herein are directed to tape library systems, and related technology, it will be appreciated by those skilled in the art that the claimed technology can be applied to other physical storage systems, such as storage drive arrays, without departing from the scope of the claimed technology.

It will be clear that the claimed technology is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed technology disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed:

1. An apparatus comprising:
   a processor-based storage controller;
   a nontransient, tangible computer memory configured to store a plurality of data files; and
   computer instructions stored in the computer memory defining container-level array storage logic that is configured to be executed by the controller to logically containerize the data files in a predetermined plurality of virtual storage containers, the data files stored sequentially from a beginning of one of the predetermined plurality of virtual storage containers to an end of another one of the predetermined plurality of virtual storage containers, all of the sequentially stored files in each of the predetermined plurality of virtual storage containers defining a respective container-level stripe unit, and to flush the predetermined plurality of virtual storage containers by migrating each container-level stripe unit to a respective physical storage device.

2. The apparatus of claim 1 wherein the sequentially containerized data files fill each respective virtual storage container.

3. The apparatus of claim 1 wherein one of the data files has a first portion in a first virtual storage container and a second portion in a second virtual storage container.

4. The apparatus of claim 1 wherein the sequentially containerized data files include different size data files.

5. The apparatus of claim 1 wherein the container-level array storage logic is configured to compress the data files in a virtual storage container before migrating the container-level stripe units to the respective physical storage devices.

6. The apparatus of claim 1 wherein the container-level array storage logic is configured to migrate a plurality of the container-level stripe units forming a stripe across the physical data storage devices.

7. The apparatus of claim 6 wherein the container-level array storage logic is configured to store parity data for the containerized data files as another container-level stripe unit, and to stripe the containerized data files across the physical data storage devices with rotating parity.

8. The apparatus of claim 6 wherein the container-level array storage logic is configured to construct a padding file so that the plurality of data files in one of the virtual storage containers combined with the padding file fills that virtual storage container.

9. The apparatus of claim 1 comprising a first plurality of data files in a first virtual storage container, a second plurality of data files in a second virtual storage container, and parity data for the first plurality and the second plurality of data files in a third virtual storage container, wherein the container-level array storage logic is configured to concurrently flush the entire contents of the first, second, and third virtual storage containers to the physical storage devices.

10. The apparatus of claim 1 wherein the number of virtual storage containers and the number of physical storage devices is the same.

11. The apparatus of claim 1 wherein the physical storage devices are tape cartridges.

\* \* \* \* \*